(12) United States Patent
Sultan et al.

(10) Patent No.: US 8,427,940 B2
(45) Date of Patent: Apr. 23, 2013

(54) METHOD OF M:1 PROTECTION

(75) Inventors: Robert Sultan, Somers, NY (US); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/253,789

(22) Filed: Oct. 5, 2011

(65) Prior Publication Data

US 2012/0026867 A1 Feb. 2, 2012

Related U.S. Application Data

(63) Continuation of application No. 12/861,415, filed on Aug. 23, 2010.

(60) Provisional application No. 61/246,819, filed on Sep. 29, 2009.

(51) Int. Cl.
*G06F 11/00* (2006.01)
*G01R 31/08* (2006.01)

(52) U.S. Cl.
USPC ........... 370/225; 370/216; 370/217; 370/221; 370/227; 370/228

(58) Field of Classification Search ................. 370/228, 370/225, 216, 217, 221, 227
See application file for complete search history.

(56) References Cited

U.S. PATENT DOCUMENTS

| | | | |
|---|---|---|---|
| 7,680,032 B1* | 3/2010 | Pheiffer et al. | 370/222 |
| 2003/0018812 A1 | 1/2003 | Lakshminarayana et al. | |
| 2005/0276217 A1* | 12/2005 | Gadgil et al. | 370/225 |
| 2006/0004916 A1 | 1/2006 | Caviglia et al. | |
| 2007/0036073 A1 | 2/2007 | Yamada et al. | |
| 2010/0135291 A1* | 6/2010 | Martin et al. | 370/389 |
| 2010/0287405 A1* | 11/2010 | Soon | 714/4 |

FOREIGN PATENT DOCUMENTS

| | | |
|---|---|---|
| CN | 1703886 A1 | 11/2005 |
| CN | 1728645 A | 2/2006 |
| CN | 101141349 A | 3/2008 |
| WO | 2009090723 A1 | 7/2009 |

OTHER PUBLICATIONS

"Draft Standard for Local and Metropolitan Area Networks-Std P802.1Qay", Jan. 21, 2009, IEEE.*
Foreign Communication From a Related Counterpart Application— International Search Report, PCT/CN2010/076566, Dec. 9, 2010, 5 pages.
Foreign Communication From a Related Counterpart Application— Written Opinion, PCT/CN2010/076566, Dec. 9, 2010, 8 pages.

(Continued)

*Primary Examiner* — Huy D Vu
*Assistant Examiner* — Omer Mian

(57) ABSTRACT

An apparatus comprising a first segment endpoint bridge (SEB) configured to couple to a second SEB via a plurality of path segments, wherein the path segments comprise a working segment and a plurality of candidate protection segments, wherein the candidate protection segments comprise a protection segment that is configured to protect the working segment, wherein the candidate protection segments other than the protection segment do not protect the working segment, wherein one first state variable is used to maintain each of the candidate protection segments, and wherein a plurality of second state variables are used to maintain each of the working segment and the protection segment.

20 Claims, 7 Drawing Sheets

OTHER PUBLICATIONS

"IEEE Standard for Local and Metropolitan Area Networks—Virtual Bridged Local Area Networks, Amendment 10: Provider Backbone Bridge Traffic Engineering," IEEE Std. 802.1Qay-2009, Aug. 5, 2009.

"Draft Standard for Local and Metropolitan Area Networks—Virtual Bridged Local Area Networks—Amendment PBB-TE Infrastructure Segment Protection," IEEE P802.1Qbf/D0.2, Mar. 4, 2010.

"Draft Standard for Local and Metropolitan Area Networks—Virtual Bridged Local Area Networks—Amendment PBB-TE Infrastructure Segment Protection," IEEE P802.1Qbf/D0.3, Jun. 25, 2010.

"Series G: Transmission Systems and Media, Digital Systems and Networks—Packet Over Transport Aspects—Ethernet Over Transport Aspects—Series Y: Global Information Infrastructure, Internet Protocol Aspects and Next-Generation Networks—Internet Protocol Aspects—Transport; Ethernet Linear Protection Switching," ITU-T G8031/Y.1342 (Nov. 2009).

"IEEE Standard for Local and Metropolitan Area Networks—Virtual Bridged Local Area Networks, Amendment 5, Connectivity Fault Management," IEEE Std. 802.1ag-2007, Dec. 17, 2007.

Sultan, "PBB-TE Infrastructure Protection Switching Operation," Joint ITU-T / IEEE Workshop on The Future of Ethernet Transport, Geneva, May 28, 2010, 12 pages.

* cited by examiner

US 8,427,940 B2

METHOD OF M:1 PROTECTION

CROSS-REFERENCE TO RELATED APPLICATIONS

The present application is a continuation of U.S. patent application Ser. No. 12/861,415, filed Aug. 23, 2010 by Robert Sultan, et al. and entitled "Method of M:1 Protection," which claims priority to U.S. Provisional Patent Application No. 61/246,819 filed Sep. 29, 2009 by Robert Sultan, et al. and entitled "Method of M:1 Protection," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as Ethernet based networks, are comprised of nodes that transport data through the network. The nodes may include routers, switches, and/or bridges that transport the individual data frames or packets through the network. The nodes select paths for the individual data frames to travel through the network. A path is established from a first node to a second node, and the data frames are mapped to this path. The path may comprise a plurality of segments that connect between different nodes in the path. Each path may also be allocated or assigned network resources including dedicated bandwidth. Accordingly, the nodes along the path do not have to determine the path to transport the data frames. Instead, the nodes merely transport the data to the next node in the path. The data is transported from node to node through the network until the data arrives at the last node. The flow of data frames along the path may be referred to as a service instance (SI).

SUMMARY

In one embodiment, the disclosure includes an apparatus comprising a first segment endpoint bridge (SEB) configured to couple to a second SEB via a plurality of path segments, wherein the path segments comprise a working segment and a plurality of candidate protection segments, wherein the candidate protection segments comprise a protection segment that is configured to protect the working segment, wherein the candidate protection segments other than the protection segment do not protect the working segment, and wherein one first state variable is used to maintain each of the candidate protection segments, and wherein a plurality of second state variables are used to maintain each of the working segment and the protection segment.

In another embodiment, the disclosure includes a network comprising at least one processor coupled to a memory and configured to monitor a working segment between two SEBs along a path using a plurality of first state variables, monitor a plurality of candidate protection segments using one third state variable per port for each of the candidate protection segments, select from the candidate protection segments a protection segment that is operational and has a highest priority among the candidate protection segments, and switch traffic assigned to the working segment from the working segment to the protection segment if the working segment fails.

In yet another embodiment, the disclosure includes a method comprising controlling operations of a working segment and a protection segment between two SEBs along a path using a one-for-one (1:1) protection state machine, selecting a protection segment from a plurality of candidate protection segments that are provisioned between the two SEBs that is operational and has a highest priority among the candidate protection segments using a protection segment selection (PSS) state machine, and allowing operations of each of the candidate protection segments without conflict with operations of other segments using a M-for-one (M:1) hold-off state machine.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Institute of Electrical and Electronics Engineers (IEEE) 802.1Qay describes an end-to-end 1:1 protection function that uses a 1:1 protection state machine for Traffic Engineered Service Instances (TESIs). IEEE 802.1Qay is incorporated herein by reference as if reproduced in its entirety. The 1:1 protection function protects a working path with a protection path, which may be used to transfer traffic instead of the working path if the working path fails. IEEE 802.1Qbf also describes the previously proposed 1:1 and M:1 protection functions (M is an integer) for a segment of the network that is traversed by a group of TESIs. IEEE 802.1Qbf is also incorporated herein by reference as if reproduced in its entirety. The M:1 protection function provisions M candidate protection segments, any of which may be used to transfer traffic instead of a working segment of a path if the working segment fails. The 802.1Qbf 1:1 protection function may be supported using a 1:1 protection state machine that is proposed in 802.1Qay. However, the M:1 protection function uses a M:1 protection state machine that maintains a protection segment list to handle the M candidate protection segments, which substantially expands the implementation of the 1:1 protection function.

Disclosed herein is a system and method for providing an M:1 protection function in a network. The system and method may use the proposed 1:1 protection state machine in 802.1Qay, where a list of candidate protection path segments exists, wherein a protection segment that is operational and has a highest priority among the candidate protection segments may be selected from the candidate protection segments. Subsequently, if a connectivity failure is detected on the selected protection segment, then another member from the candidate protection segments, which may have a next highest priority and a verified connectivity, may be selected as the protection segment instead of the failed protection segment. A separate procedure or function, which may select the protection segment from a prioritized list of candidate protection segments, may be used with the 1:1 protection state machine in 802.1Qay to provide an M:1 protection function. Thus, the proposed system and method herein may not require a substantial amount of additional processing and may be simpler to implement than other M:1 protection schemes.

Figure 1:
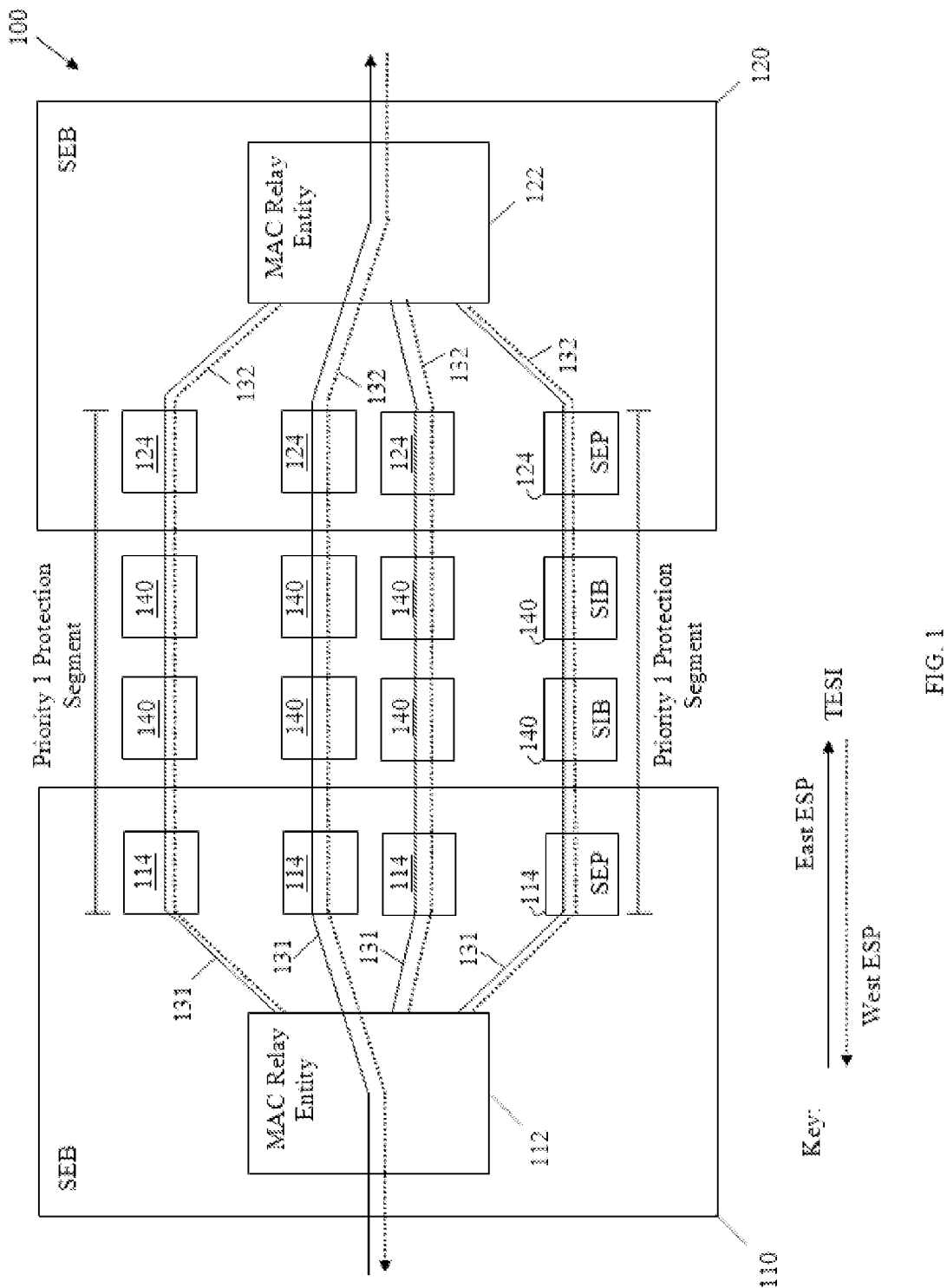
FIG. 1 is a schematic diagram of an embodiment of an M:1 protection system.

FIG. 1 illustrates an embodiment of an M:1 protection system 100, which may be established in a network, such as an Ethernet based network. The M:1 protection system 100 may comprise a first SEB 110 and a second SEB 120 that may be coupled to the first SEB 110 via a plurality of first Ethernet Switched Paths (ESPs) 131 and a plurality of corresponding second ESPs 132, e.g. along a path in the network. Additionally, the M:1 protection system 100 may comprise a plurality of segment intermediate bridges (SIBs) 140 that may be positioned between the first SEB 110 and the second SEB 120 and used to establish the first ESPs 131 and the second ESPs 132, as shown in FIG. 1.

Further, the first SEB 110 may comprise a first Media Access Control (MAC) relay entity 112 and a plurality of first segment endpoint ports (SEPs) 114 that correspond to the first ESPs 131 and the second ESPs 132. Similarly, the second SEB 120 may comprise a second MAC relay entity 122 and a plurality of second SEPs 124 that correspond to the first ESPs 131 and the second ESPs 132. The first ESPs 131 and the corresponding second ESPs 132 may be unidirectional ESPs oriented in opposite directions (e.g. East ESP and West ESP) and may traverse the corresponding first SEPs 114 and the first MAC relay entity 112 in the first SEB 110 and the corresponding second SEPs 122 and the second MAC relay entity 124 in the second SEB 120.

The first SEB 110, the second SEB 120, and the SIBs 140 may be any devices that are configured to transport frames through the network. For example, the first SEB 110, the second SEB 120, and the SIBs 140 may comprise bridges, switches, routers, or various combinations of such devices. Such devices typically comprise a plurality of ingress ports for receiving frames from other nodes, logic circuitry to determine which nodes to send the frames to, and a plurality of egress ports for transmitting frames to the other nodes. The ingress ports and egress ports may comprise the first SEPs 114 in the first SEB 110 and the second SEPs 124 in the second SEB 120. The logic circuitry may comprise the first MAC relay entity 112 in the first SEB 110 and the second MAC relay entity 122 in the second SEB 120, and may process the frames at the link layer (e.g. using the Ethernet protocol).

In an embodiment, the first SEB 110 and/or the second SEB 120 may comprise a Backbone Edge Bridge (BEB), an I-component and B-component BEB (IB-BEB), and/or a Backbone Core Bridge (BCB). The SIBs 140 may also comprise IB-BEBs and/or BCBs. The first SEPs 114 and the second SEPs 124 may be configured to support the unidirectional first ESPs 131 and second ESPs 132, which may comprise Provider Network Ports (PNPs). Accordingly, the first SEPs 114 and the second SEPs 124 may support forwarding traffic in the direction from the first SEB 110 to the second SEB 120 along the unidirectional first ESP 131 and in the opposite direction from the second SEB 120 to the first SEB 110 along the unidirectional ESP 132.

Specifically, one first ESP 131 and one corresponding second ESP 132 may correspond to a bidirectional TESI in the network. The first ESP 131 and the second ESP 132 (e.g. the TESI) may traverse a segment (e.g. working segment) of a path, which may be provisioned (e.g. traffic engineered) to transfer traffic between the first SEB 110 and the second SEB 120. Additionally, a plurality of candidate protection segments may be provisioned between the first SEB 110 and the second SEB 120 and associated with the working segment. The candidate protection segments may comprise a protection path that is selected for the working path to transfer traffic assigned to the working path if the working path fails, e.g. using a 1:1 protection function and/or 1:1 protection state machine. If the selected protection segment becomes non-operational or fails, then the failed protection segment may be replaced by a second protection segment from the candidate protection segments. The candidate protection segments may be specified in a candidate protection segment list, and may correspond to the same Infrastructure Protection Group (IPG) as the working segment.

The candidate protection segments in the IPG list may be different and mutually disjoint with respect to each other and to the working segment. Further, each of the candidate protection segments may be assigned a priority that is unique (e.g. 0, 1, 2, etc.) and may be in an operational or non-operational state. The candidate protection segment that has the highest priority (e.g. lowest numeric value, such as about zero) among the candidate protection segments in the list and that is operational may be selected as the protection segment for the working segment in the 1:1 protection function and the 1:1 protection state machine.

However, if the selected protection segment becomes non-operational or fails, which may be detected by the network at any time, another candidate protection segment that is operational and that may have the next highest priority (e.g. the next lowest numeric value, such as about one) may be selected as the protection segment. Further, if a non-operational candidate protection segment that has a higher priority than the selected protection segment becomes operational, which may be detected by the network at any time, the new highest priority and operational candidate protection segment may be selected as the protection segment for the working segment. Such protection scheme for selecting a protection segment for the working segment from a set of candidate protection segments may provide M:1 protection for the working segment without jointly maintaining, monitoring, and processing M candidate segments and their states in the IPG and without substantially extending the 1:1 protection state machine in IEEE 802.1Qay.

Figure 2:
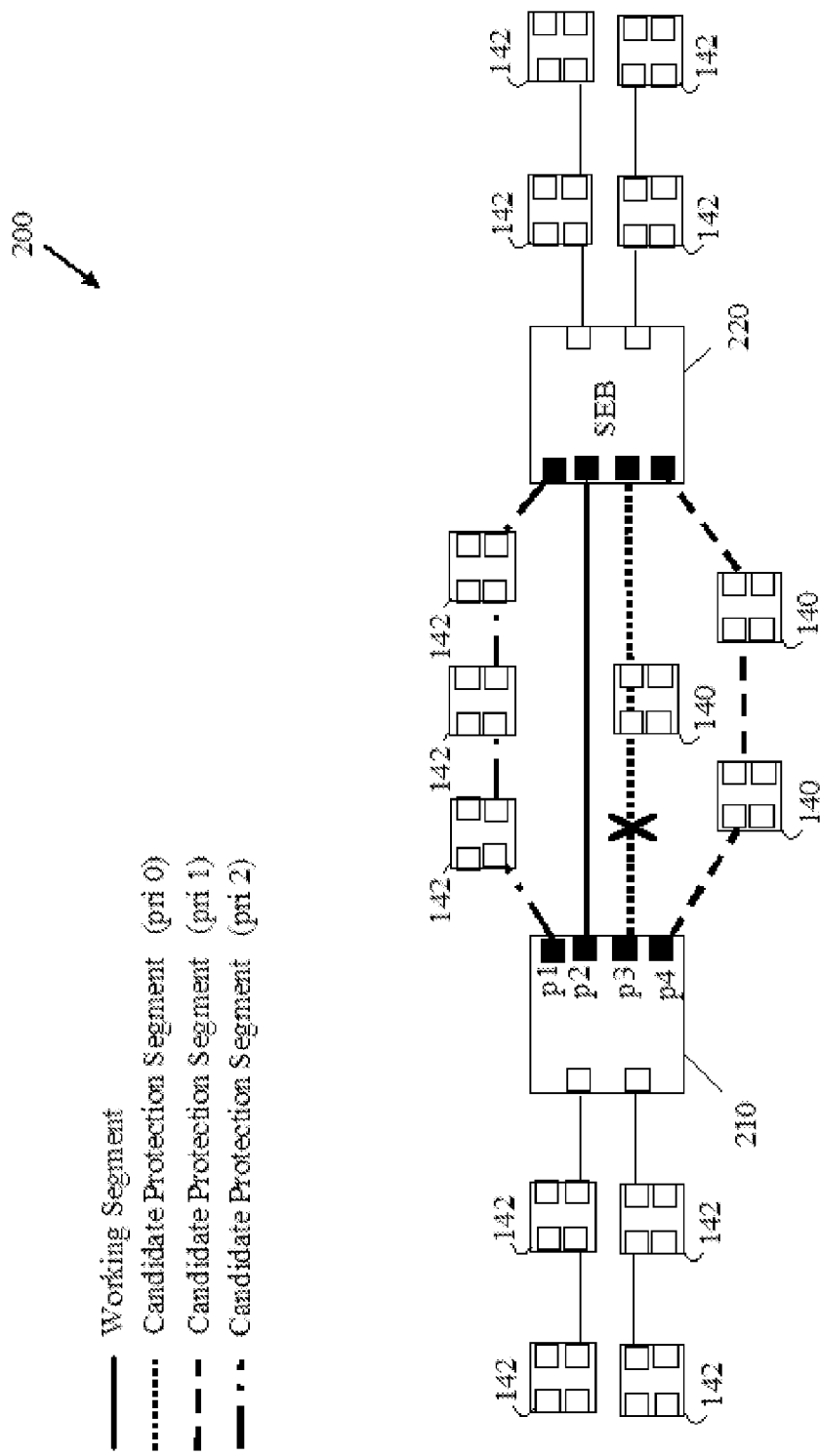
FIG. 2 is a schematic diagram of an embodiment of a protection scheme.

FIG. 2 illustrates an embodiment of a protection scheme 200, which may be used in an M:1 protections system, such as the M:1 protection system 100. The M:1 protection system may comprise a first SEB 210, a second SEB 220, and a plurality of SIBs 140, which may be configured substantially similar to the corresponding components of the M:1 protection system 100. The M:1 protection system may also comprise a plurality of nodes (e.g. bridges) 142, which may be similar to or different than the SIBs 140. Some of the nodes 142 may be coupled to the first SEB 210 and the second SEB 220, e.g. along a path. The first SEB 210 and the second SEB 220 may be coupled via a plurality of segments. The segments between the first SEB 210 and the second SEB 220 may comprise a working segment and a plurality of candidate protection segments for any IPG established between the first SEB 210 and the second SEB 220.

For example, a working segment for an IPG may be associated with port two (p2) (represented by a solid line) and a corresponding protection segment may be initially selected from the candidate protection segments for the same IPG, which may be associated with port three (p3) (represented by a dotted line). The selected protection segment may be initially operational and have the highest priority (e.g. pri 0) in a list of candidate protection segments for the IPG. Additionally, the list of candidate protection segments may comprise a second segment (represented by a dashed line) that may be assigned to port four (p4), have a next highest priority (e.g. pri 1) and may be operational, and a third segment (represented by an alternating dotted and dashed line) that may be assigned to port one (p1), have lower priority (e.g. pri 2), and may be operational.

In an embodiment, the working segment, the protection segment, and candidate protections segments may be maintained, e.g. in a list or table, at the first SEB 210, the second SEB 220, or a network management entity. The first SEB 210, the second SEB 220, and/or the network may monitor the states of the different segments using the connectivity check specified in IEEE 802.1ag connectivity fault management (CFM). IEEE 802.1ag is incorporated herein by reference as if reproduced in its entirety. If a failure is detected at the working segment, such as a link fault, traffic congestion, or any change in traffic rate, the traffic may be switched to the selected protection segment, e.g. using the 1:1 protection function and/or the 1:1 protection state machine in IEEE 802.1Qay.

Further, if a failure is detected in the selected protection segment, then a second candidate protection segment from the list of candidate protection segments may be selected as the active protection segment for the working segment instead of the failed protection segment. The selected second candidate protection segment may be operational and have the next highest priority in the list of candidate protection segments. For example, if the initially selected protection segment associated with p3 that has the highest priority (e.g. pri 0) fails or becomes non-operational, the candidate protection segment associated with p4 that has the next highest priority (e.g. pri 1) may be selected as the active protection segment instead of the protection segment associated with p3. The candidate protection segment associated with p4 may be selected because it is operational and has a higher priority than the candidate protection segment associated with p1, which has a priority of 2.

Selecting a candidate protection segment from a list of M candidate protection segments as the active protection segment for the working segment may provide an M:1 protection function. As such, the protection scheme 200 may use the 1:1 protection state machine in IEEE 802.1Qay to switch traffic from the working segment to the active protection segment in the case of detecting any failure of the working segment. Additionally, the protection scheme may use a PSS state machine that selects the protection segment from the candidate protection segment list. The PSS sate machine may be implemented synchronously with the 1:1 protection state machine such as one of the two state machines may execute a transition function at any given time. The PSS state machine may also have access to the variables or parameters of the 1:1 protection state machine, as described below.

Figure 3:
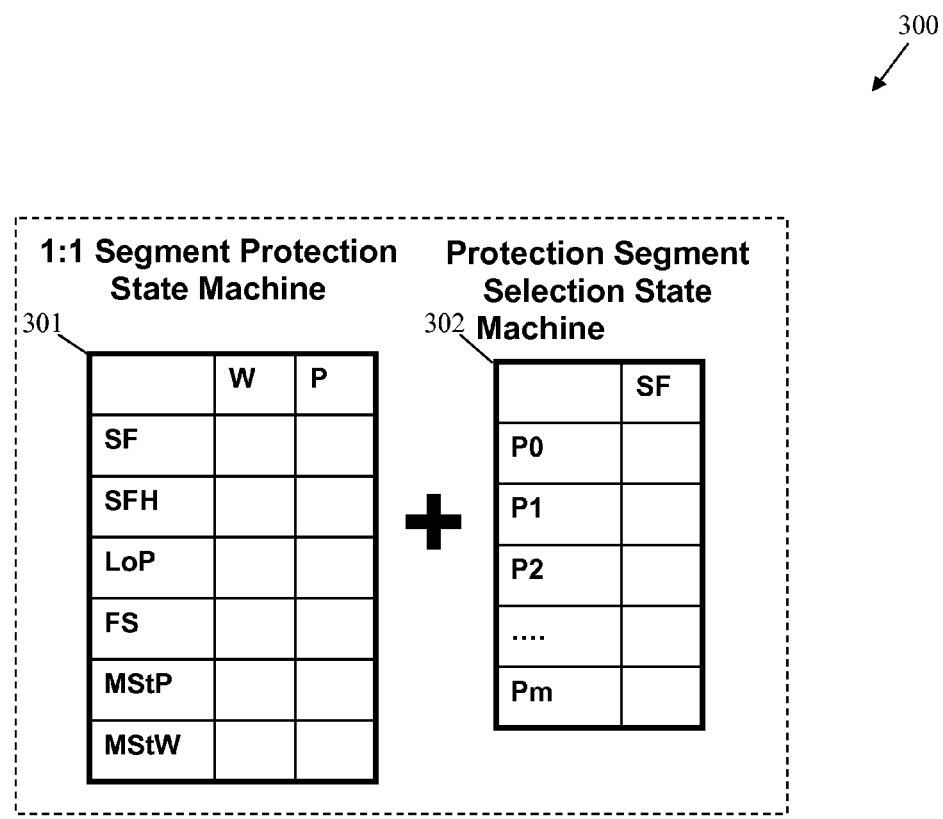
FIG. 3 is a schematic diagram of an embodiment of memory requirement for a combination of state machines.

FIG. 3 illustrates an embodiment of memory requirement 300 for a combination of state machines, which may be used in the protection scheme 200 and/or the M:1 protection system 100. The memory requirement 300 may comprise a first memory portion 301 that supports a 1:1 segment protection state machine, such as in IEEE 802.1Qay, and a second memory portion 302 that supports a protection segment selection (PSS) state machine. The PSS state machine may be used to select the active protection segment from a list of alternate or candidate protection segments.

The first memory portion 301 may comprise a plurality of parameters or variables that may describe the states of the working segment (W) and the selected active protection section (P). The parameters or variables may comprise SF, SFH, LoP, FS, MStProtection (MStP), and MStWorking (MStW), which may be described in IEEE 802.1Qbf. The second memory portion 302 may comprise the SF variable for each of the m (m is an integer equal to M) ports associated with M alternate or candidate protection segments (e.g. P0, P1, P2 . . . , Pm).

The SF variable may be a logical OR of a someRMEPC-CMdefect procedure, a someRDIdefect procedure, an xCon-CCMdefect procedure, and an errorCCMdefect procedure, which are all described in IEEE 802.1Qbf. Specifically, the SFH variable may be a Boolean flag that is set and cleared by a Hold-off state machine to indicate that SF is set for a period which is greater than or about equal to a HoldOffTime, as described in IEEE 802.1Qbf. The SFH variable may be set equal to SF if a Hold-Off timer is not supported. The LoP variable may be a Boolean flag that indicates the administrative state of the protection entity. If set, the LoP variable may prohibit the use of the protection entity (e.g. segment). The value of the LoP variable may be controlled by an administrator action, as described in item b2 in IEEE 802.1Qbf section 12.20.2.3.2. The FS variable may be a Boolean flag that indicates the presence of an administrative command to force switch the data traffic to the protection TE service instance entity. The value of the FS variable may be set to about one by an administrator action, as described in item b3 in IEEE 802.1Qbf section 12.20.2.3.2. The FS variable may be reset by an administrator action that corresponds to a request of the same or higher priority according to Table 26-8 in IEEE 802.1Qbf. The MStP variable may be a Boolean flag that indicates the presence of an administrative command to manually switch the data traffic to the protection TE service instance entity, in the absence of a failure of the working or the protection TE service instance entity. The MStP variable value may be set to about one by an administrator action, as described in item b4 in 12.20.2.3.2. The MStP variable may be reset by an administrator action that corresponds to a request of the same or higher priority according to Table 26-8 in IEEE 802.1Qbf and by the operation of a Clear Manual Switch state machine, as described in IEEE 802.1Qbf.

In an embodiment, the PSS state machine may be configured to control a protection signal fail condition that may be used as input by the 1:1 protection state machine. Accordingly, if all the candidate protection segments fail, the PSS state machine may indicate a protection signal fail condition to the 1:1 protection state machine and may apply the Hold-off timer if needed. Otherwise, as long as one of the candidate protection segments is operational, the protection signal fail condition is not indicated to the 1:1 protection state machine (e.g. set to FALSE) unless it may be needed to drive the 1:1 protection sate machine to a desired state. If the 1:1 protection state machine indicates a protection segment is in use and traffic may not be switched back to the working segment, the PSS state machine may also reconfigure traffic forwarding to replace the failed protection segment with the newly selected protection segment. If it is appropriate to switch back to the working segment rather than to a new protection segment, the PSS state machine may temporarily indicate the protection signal fail condition to cause the 1:1 state machine to switch back to the working segment.

Further, if the selected candidate protection segment subsequently fails, the selected candidate protection segment may be replaced by another entry in the candidate protection segment list by the same action of the PSS state machine. When a fault on a protection segment, e.g. either the provisioned protection segment or a selected candidate protection segment, is cleared, the PSS state machine may evaluate the preferred protection segment and update the port associated with the active protection segment in the IPG list. As such, traffic forwarding may not be changed unless the 1:1 protection state machine subsequently acts, e.g. if the change affects the protection signal fail condition.

Figure 4:
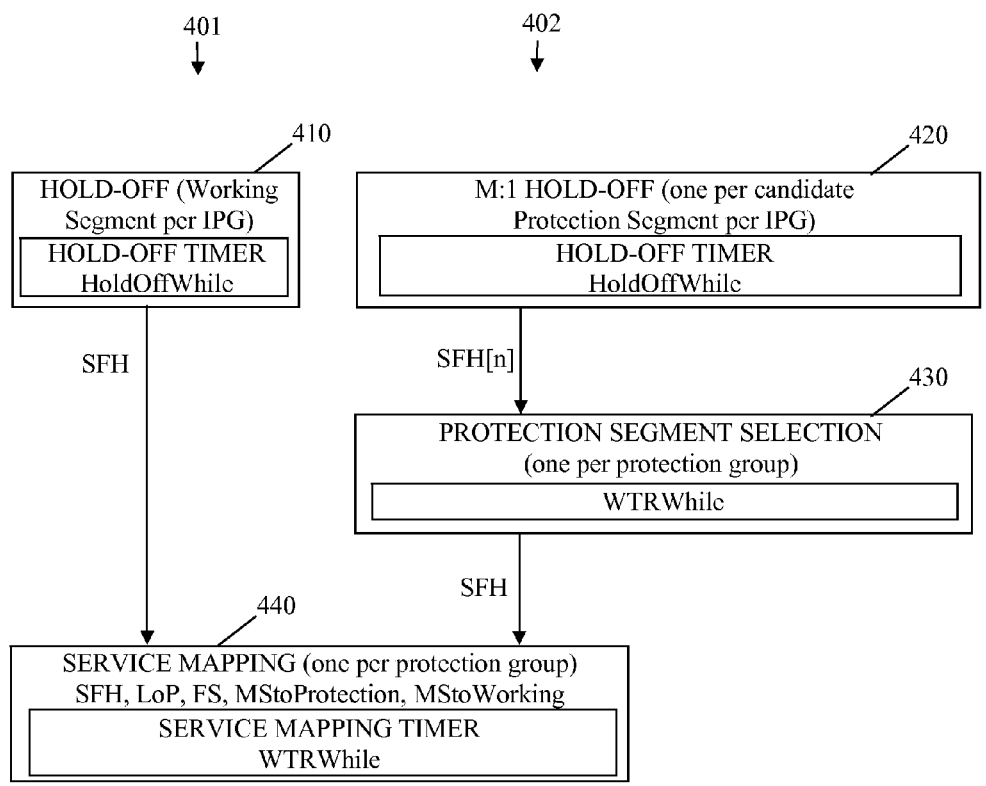
FIG. 4 is a schematic diagram of an embodiment of a plurality of M:1 state machines.

FIG. 4 illustrates an embodiment of multiple M:1 state machines that may be implemented to provide an M:1 protection function, e.g. in the protection scheme 200 and/or the M:1 protection system 100. The M:1 state machines may be implemented using hardware, software, or both. The M:1 state machines may be M:1 Infrastructure Protection Switching (IPS) state machines, such as described in IEEE 802.1Qbf. The M:1 state machines may be specified using the notational conventions defined in Annex B of IEEE 802.1Qbf. In case of multiple instances of a state variable in the M:1 state machines, each instance may be represented by adding the suffix [n] to indicate the n-th instance (n is an integer). The timers used in the M:1 state machines may be described in section 26.10.32 of IEEE 802.1Qbf. The M:1 state machines may comprise a Hold-off state machine 401 for the working segment in the IPG and an M:1 Hold-off state machine 402 for each candidate protection segment. The Hold-off state machine 401 may comprise blocks 410 and 440 and may be established to synchronize the operations of the working segment with the operations of the other segments. The M:1 Hold-off state machine 402 may comprise blocks 420 and 430 and may be established for each candidate protection segment in the IPG. The M:1 Hold-off state machine 402 may interact with the Hold-off state machine 401, for instance block 430 of the M:1 Hold-off state machine 402 may call or initiate block 440 of the Hold-off state machine 401.

At block 410 of the Hold-off state machine 401, a Hold-off procedure may be performed, e.g. for the working segment per IPG. As such a Hold-off timer may be set to coordinate timing of protection switches at multiple layers or across cascaded or nested protected domains. For example, the Hold-off timer may be used to synchronize between the operations of the PSS state machine 402 and other used state machines. If the SFH variable is TRUE, then the Hold-off state machine 401 may proceed to block 440, e.g. after the Hold-off timer expires. At block 440, a service mapping procedure may be performed, e.g. per protection group. The service mapping procedure may use/set the variables SFH, LoP, FS, MStP, and/or MStW. As such, a service mapping timer, WTRwhile, may be set. The WTRwhile timer may be used to prevent frequent operation of the protection switch due to an intermittent defect. The WTRwhile timer may allow for a fixed period of time to elapse before data traffic is mapped from the protection TE service instance entity to the working TE service instance entity when in revertive mode.

At block 420 of the M:1 Hold-off state machine 402, an M:1 Hold-off procedure may be performed, e.g. per candidate protection segment per IPG. As such a second corresponding Hold-off timer may be set to coordinate timing, e.g. with the Hold-off state machine 401 and/or protection switches at multiple layers or across cascaded or nested protected domains. If the SFH variable for the n-th instance is TRUE, then the M:1 Hold-off state machine 402 may proceed to block 430, e.g. after the second Hold-off timer expires. At block 430, a protection segment selection procedure may be performed, e.g. per protection group. The protection segment procedure may select one of the candidate protection segments in the candidate segment list, as described above. As such, a second service mapping timer, WTRwhile, may be set. If the SFH variable is TRUE, then the M:1 Hold-off state machine 402 may proceed to block 440 of the Hold-off state machine 401, e.g. after the second WTRwhile timer expires.

Some of the variables that may be used in the M:1 IPS state machines may comprise BEGIN, SF, SFH, stateChange, pri, crntPS, WRTTime, and HoldOffTime, which are described in IEEE 802.1Qbf. The BEGIN variable may be a Boolean variable that is controlled by the system initialization process. If the value of the BEGIN variable is TRUE, the M:1 IPS state machines per IPG may continuously execute their initial state. Alternatively, if the value of the BEGIN variable is FALSE, then the M:1 IPS state machines may perform transitions out of their initial state, in accordance with the relevant state machine definitions. The stateChange variable may be a Boolean flag that is set by the M:1 Hold-off state machine 402 and cleared by a PSS state machine to indicate that the value of the SFH variable that is associated with a candidate protection segment has changed. An instance of the stateChange variable, which may be identified by the notation stateChange[n], may be specified per candidate protection segment. The pri variable may be an integer value that is associated with each candidate protection segment, may be unique within the IPG, and may indicate the selection priority of a candidate protection segment. Lower numeric values of the pri variable may be associated with higher priority. An instance of the pri variable, which may be identified by the notation pri[n], may be specified per candidate protection segment. The crntPs variable may be an integer value that identifies the operational candidate protection segment that has the highest selection priority (e.g. lowest numeric value). The value of the crntPs variable may be indeterminate if there are not any available candidate protection segments.

Some of the procedures that may be used in the M:1 IPS state machines may comprise allPsFailed( ) highestPriOperPs( ) setPs(n), and mapDataToProtection( ) which are described in IEEE 802.1Qbf. The allPsFailed( ) procedure may return a TRUE value if SFH[n] is equal to TRUE for all candidate protection segments or may return FALSE otherwise. The highestPriOperPs( ) procedure may return the identity of the highest priority candidate protection segment for which SFH[n] is equal to FALSE or may return the value NULL if SFH[n] is equal to TRUE for all the candidate protection segments. The setPs(n) procedure may establish the nth candidate protection segment as the protection segment referenced by a service mapping state machine.

Figure 5:
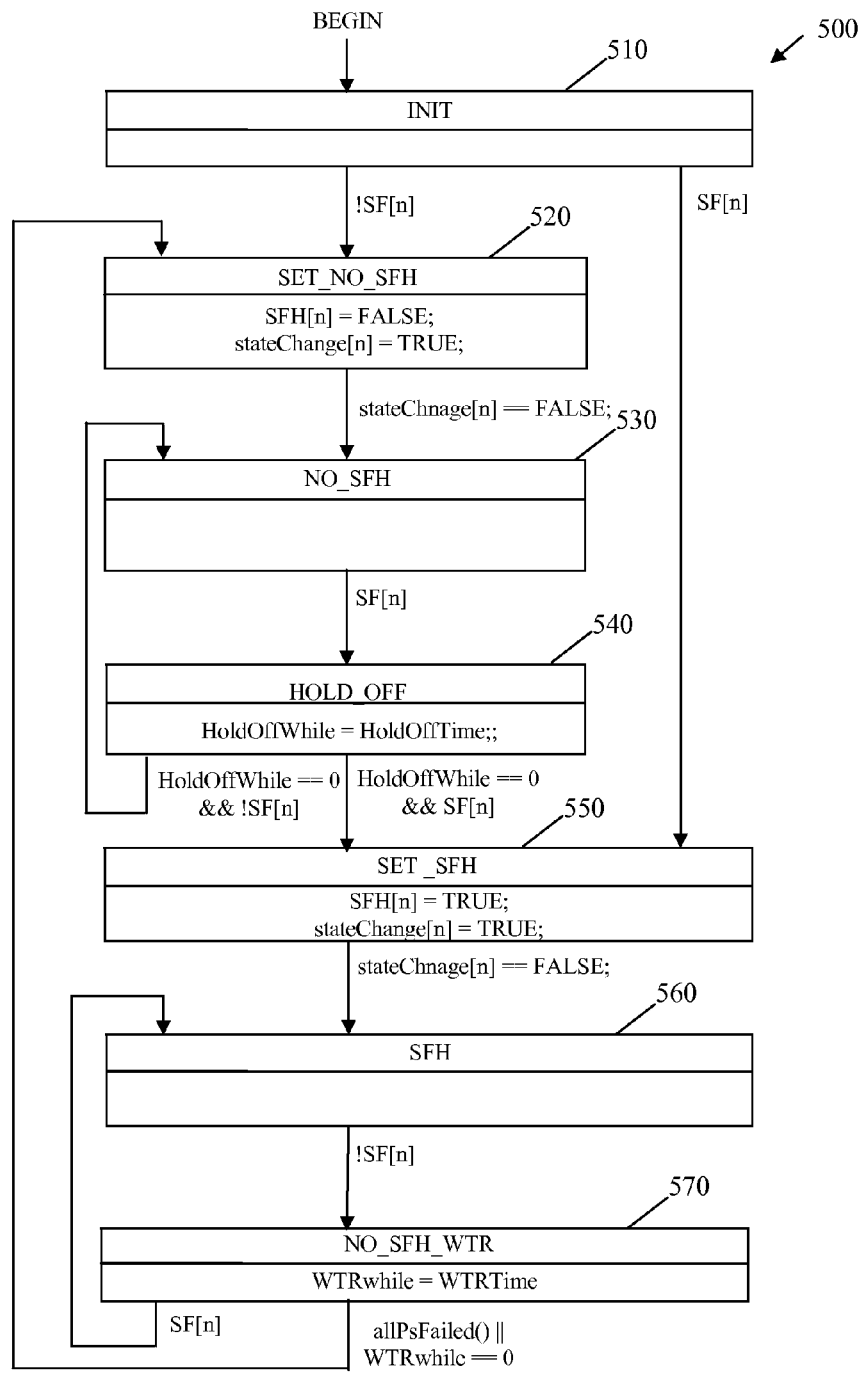
FIG. 5 is a schematic diagram of an embodiment of an M:1 Hold-off state machine.

FIG. 5 illustrates an embodiment of a M:1 Hold-off state machine 500, which may correspond to the M:1 Hold-off state machine 402 and may be used to set the SF variable to true for a period of time to allow the operations of other state machines, e.g. the PSS state machine, without conflict. At block 510, an initialization (INIT) procedure may be performed, which may comprise the initialization of a plurality of variables. The M:1 Hold-off state machine 500 may proceed to block 520 if the SF variable for the n-th instance is set to FALSE or to block 550 if the SF variable is set to TRUE. At block 520, a SET_NO_SFH procedure may be performed. As such, the SFH variable may be set to FALSE and the stateChange variable for the n-th instance may be set to true. The M:1 Hold-off state machine 500 may proceed to block 530 if the stateChange variable is changed to FALSE, e.g. by another state machine or if a timer expires. At block 530, a NO_SFH procedure may be performed, where the SFH value may be examined. The M:1 Hold-off state machine 500 may then proceed to block 540 if the SF variable is TRUE.

At block 540, a HOLD_OFF procedure may be performed. As such, a HoldOffWhile variable may be set to a HoldOffTime value. Using the HoldOffWhile variable may allow a server layer protection switch to have a chance to fix a problem before switching at a client layer, to allow an upstream protected domain to switch before a downstream domain, or to allow the inner protected domain to switch before the outer protected domain in the case of IPS nested protection domains. The M:1 Hold-off state machine 500 may then proceed to block 550 if the HoldOffWhile variable is equal to about zero and the SF variable is TRUE. Alternatively, the M:1 Hold-off state machine 500 may return to block 530 if the HoldOffWhile variable is equal to about zero and the SF variable is FALSE. At block 550, a SET_SFH procedure may be performed. As such, both the SF variable and the stateChange variable may be set to TRUE. The M:1 Hold-off state machine 500 may then proceed to block 560 if the stateChange variable is FALSE, e.g. by another state machine or if a timer expires.

At block 560, a SFH procedure may be performed, where the SFH value may be examined. The M:1 Hold-off state machine 500 may then proceed to block 570 if the SF variable is FALSE. At block 570, a NO_SFH_WTR procedure may be performed. As such, the WTRwhile variable may be set to a WTRtime. The M:1 Hold-off state machine 500 may then return to block 560 if the SF variable is TRUE or to block 520 if the allPSFailed( ) procedure returns a value of about zero or the WTRwhile variable is equal to about zero.

Figure 6:
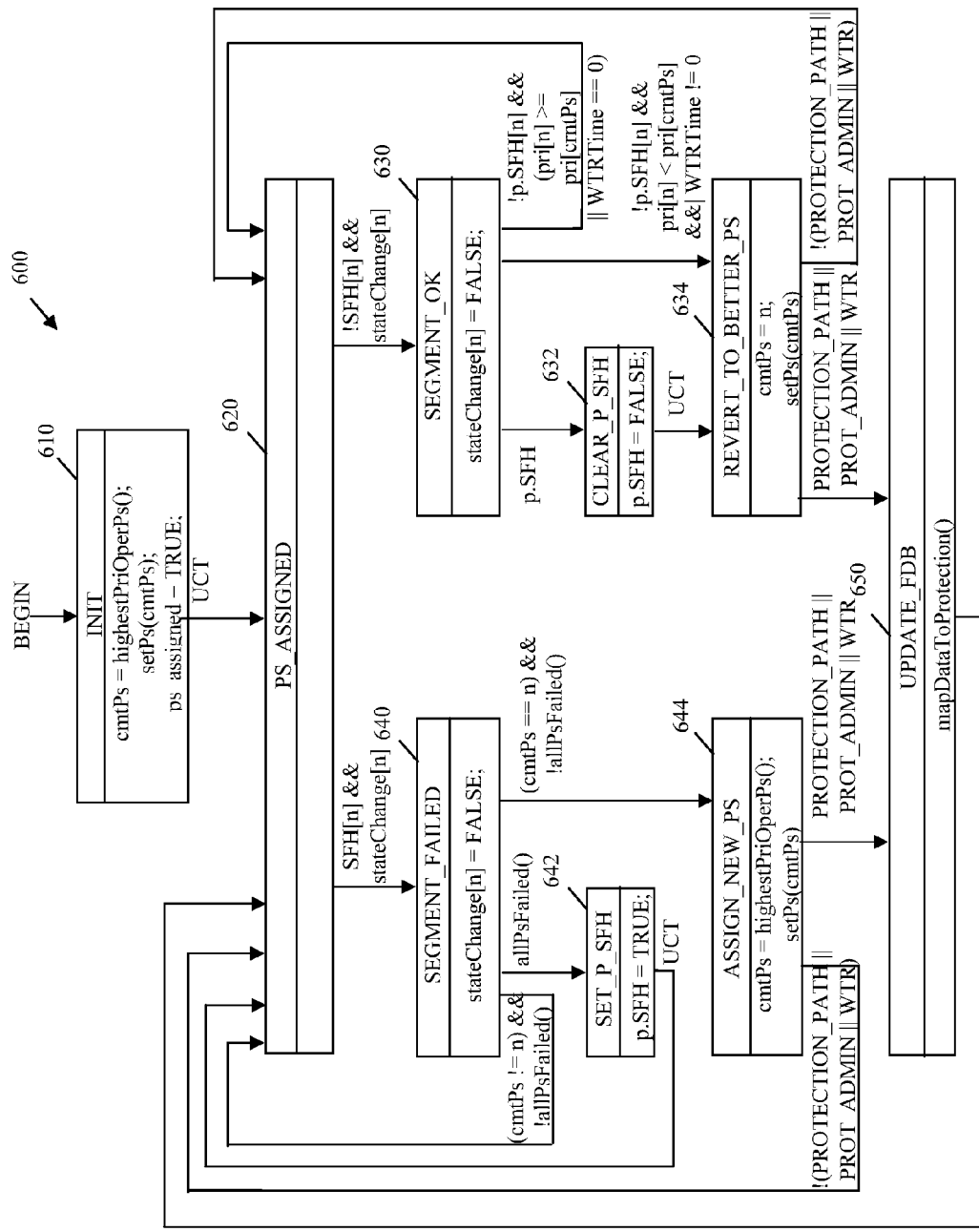
FIG. 6 is a schematic diagram of an embodiment of a protection segment selection state machine.

FIG. 6 illustrates an embodiment of a PSS state machine 600, which may be one of the M:1 IPS state machines and may be used to select an active protection segment for the working segment in the IPG from an candidate protection segment list. At block 610, an INIT procedure may be performed. As such the crntPs variable may be set to a value returned by the highestPriOperPs( ) procedure and then used as a parameter to implement the setPs( ) procedure.

Additionally, a ps_assigned variable may be set to TRUE. The PSS state machine 600 may then proceed to block 620 in an unconditional transition (UCT). At block 620, a PS_ASSIGNED procedure may be performed, where the ps_assigned value may be examined. The PSS state machine 600 may then proceed to block 630 if the SFH variable for the n-th instance is FALSE and the stateChange variable for the n-th instance is TRUE or to block 640 if both the SFH variable and the stateChange variable are both TRUE.

At block 630, a SEGMENT_OK procedure may be performed. As such, the stateChange variable may be set to FALSE. The PSS state machine 600 may then proceed to block 632 if a p.SFH variable is TRUE or return to block 620 if the p.SFH variable is FALSE and if either the priority of an candidate protection segment for the n-th instance is greater than or equal to about the priority of another candidate protection segment associated with the crntPs variable or the WTRTime variable is equal to about zero (as shown in FIG. 6). The p.SFH variable may be set to TRUE if the SFH variable is TRUE on the protection segment. Alternatively, the PSS state machine 600 may proceed to block 634 if the p.SFH is FALSE, if the priority of the candidate protection segment for the n-th instance is less than the priority of the other candidate protection segment associated with the crntPs variable, and if the WTRTime variable is not equal to about zero (as shown in FIG. 6).

At block 632, a CLEAR_P_SFH procedure may be implemented. As such, the p.SFH variable for the instance may be set to FALSE. The PSS state machine 600 may then proceed to block 634 unconditionally. At block 634, a REVERT_TO_BETTER_PS procedure may be implemented. As such, the crntPs variable may be set to the n-th instance, and hence used as a parameter to implement the setPs( ) procedure. The PSS state machine 600 may then proceed to block 650 if any of a PROTECTION_PATH procedure, a PROT_ADMIN procedure, or a WTR procedure returns a TRUE value. Alternatively, the PSS state machine 600 may return to block 620 if all of the three procedures return a FALSE value.

At block 640, a SEGMENT_FAILED procedure may be performed. As such, the stateChange variable for the n-th instance may be set to FALSE. The PSS state machine 600 may then proceed to block 642 if the allPsFailed( ) procedure returns TRUE or return to block 620 if the crntPs variable is not equal to the n-th instance and the allPsFailed( ) procedure returns FALSE. Alternatively, the PSS state machine 600 may proceed to block 644 if the crntPs variable is about equal to the n-th instance and the allPsFailed( ) procedure returns FALSE.

At block 642, a SET_P_SFH procedure may be implemented. As such, the p.SFH variable may be set to TRUE. The PSS state machine 600 may then return to block 620 unconditionally. At block 644, an ASSIGN_NEW_PS procedure may be implemented. As such, the crntPs variable may be set to a value returned by the highestPriOperPs( ) procedure and then used as a parameter to implement the setPs( ) procedure. The PSS state machine 600 may then proceed to block 650 if any of the PROTECTION_PATH, PROT_ADMIN, and WTR procedures returns a TRUE value or may return to block 620 if all three procedures return a FALSE value. At block 650, an UPDATE_FDB procedure may be implemented, where the mapDataToProtection( ) procedure may be implemented. The PSS state machine 600 may then return to block 620 unconditionally.

Figure 7:
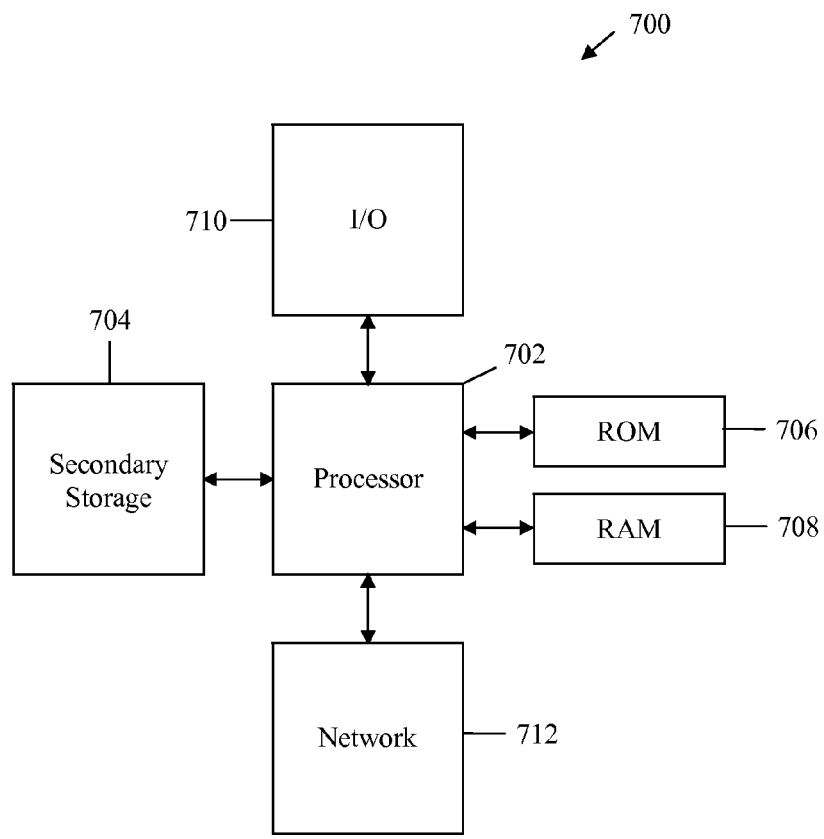
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a first segment endpoint bridge (SEB) configured to couple to a second SEB via a plurality of path segments comprising a working segment and a plurality of candidate protection segments;
   a 1:1 protection state machine, configured to switch traffic from the working segment to an active protection segment in the case of detecting failure of the working segment;
   a protection segment selection (PSS) state machine, configured to select a protection segment, from a plurality of candidate protection segments, as the active protection segment for the working protection segment;
   wherein a protection segment that is operational and has a highest priority is selected as the active protection segment from the plurality of candidate protection segments, if the active protection segment fails, another candidate protection segment which has a next highest priority and is operational is selected as the active protection segment instead of the failed active protection segment from the plurality of candidate protection segments;
   wherein the combination of the 1:1 protection state machine and the PSS state machine provides a M-for-one (M:1) protection function for the first SEB and the second SEB, where M is the quantity of the candidate protection segments;
   wherein one first state variable is used to maintain each of the candidate protection segments, a plurality of second state variables are used to maintain each of the working segment and the active protection segment; and
   wherein the 1:1 protection state machine is supported by the second state variables for each of the working segment and the active protection segment, and wherein the PSS state machine is supported by the one first state variable for each of the candidate protection segments;
   wherein the second state variables comprise a Signal Fail (SF) variable, a Signal Fail Hold-Off (SFH) variable, a Lockout of Protection (LoP) variable, a Forced Switch (FS) variable, an MStProtection (MStP) variable, and an MStWorking (MStW) variable, and wherein the first state variable comprises a SF variable for each port associated with each of the candidate protection segments.

2. The apparatus of claim 1, wherein the working segment and the candidate protection segments correspond to an Infrastructure Protection Group (IPG), wherein an IPG list is used to maintain connectivity and state information for each IPG, wherein the working segment and the candidate protections segments for the IPG are maintained at the first SEB, the second SEB, or both, and the states of the working segment and the candidate protection segments are monitored using connectivity fault management (CFM).

3. The apparatus of claim 2, wherein the first SEB, the second SEB, or both maintain a list of candidate protection segments for the IPG that indicates a priority for each one of the candidate protection segments and whether a candidate protection segment is operational.

4. A network apparatus comprising:
at least one processor coupled to a memory, wherein the memory comprises a first memory portion which comprises a plurality of second state variables supporting a 1:1 protection state machine, and a second memory portion which comprises one first state variable supporting a protection segment selection (PSS) state machine, wherein the processor is configured to:
monitor a working segment between two segment endpoint bridges (SEBs) along a path using the 1:1 protection state machine supported by the plurality of second state variables;
monitor a plurality of candidate protection segments using the PSS state machine supported by the one first state variable for each port associated with each of the candidate protection segments;
select from the candidate protection segments a protection segment that is operational and that has a highest priority among the candidate protection segments; and
switch traffic assigned to the working segment from the working segment to the protection segment if the working segment fails;
wherein the combination of the 1:1 protection state machine and the PSS state machine provides a M-for-one (M:1) protection function for the two SEBs, where M is the quantity of the candidate protection segments; and
wherein the second state variables comprise a Signal Fail (SF) variable, a Signal Fail Hold-Off (SFH) variable, a Lockout of Protection (LoP) variable, a Forced Switch (FS) variable, an MStProtection (MStP) variable, and an MStWorking (MStW) variable, and wherein the first state variable comprises a SF variable for each port associated with each of the candidate protection segments.

5. The network of claim 4, wherein an operational candidate protection segment that has a next highest priority from the candidate protection segments is selected to replace the protection segment if the protection segment fails.

6. The network of claim 5, wherein a non-operational candidate protection segment from the candidate protection segments that has a higher priority than the selected operational candidate segment is selected to replace the protection segment when the non-operational candidate protection segment becomes operational.

7. The network of claim 4, wherein the traffic is reassigned from the protection segment to the working segment if the failed working segment becomes operational.

8. The network of claim 4, wherein the working segment, the protection segment, and the candidate protection segments are continuously monitored using connectivity fault management (CFM).

9. A method comprising:
controlling operations of a working segment and a protection segment between two segment endpoint bridges (SEBs) along a path using a one-for-one (1:1) protection state machine supported by a plurality of second state variables:
selecting a candidate protection segment as the protection segment that is operational and that has a highest priority from a plurality of candidate protection segments that are provisioned between the two SEBs using a protection segment selection (PSS) state machine which is supported by one first state variable;
switching traffic assigned to the working segment from the working segment to the protection segment if the working segment fails;
wherein the combination of the 1:1 protection state machine and the PSS state machine provides a M-for-one (M:1) protection function for the two SEBs, where M is the quantity of the candidate protection segments; and
wherein the second state variables comprise a Signal Fail (SF) variable, a Signal Fail Hold- Off (SFH) variable, a Lockout of Protection (LOP) variable, a Forced Switch (FS) variable, an MStProtection (MStP) variable, and an MStWorking (MStW) variable, and wherein the first state variable comprises a SF variable for each port associated with each of the candidate protection segments.

10. The method of claim 9, wherein the PSS state machine sends a protection signal fail condition that is set to TRUE to the 1:1 protection state machine if all the candidate protection segments fail and send a protection signal fail condition that is set to FALSE to the 1:1 protection state machine if at least one of the candidate protection segments is active.

11. The method of claim 10, wherein the PSS state machine temporarily indicates the protection signal fail condition that is set to TRUE to the 1:1 protection state machine to cause the 1:1 protection state machine to switch back to the working segment when the working segment restores from a failure.

12. The method of claim 9, wherein traffic is not switched back to the working segment if the 1:1 protection state machine indicates that the protection segment is in use.

13. The method of claim 9, wherein the PSS state machine reconfigures traffic forwarding to replace the protection segment with a second protection segment from the candidate protection segments, if the protection segment fails.

14. The method of claim 9, further comprising operating each of the candidate protection segments without conflict with operations of other segments using an M-for-one (M:1) hold-off state machine comprising a stateChange variable, wherein the M:1 hold-off state machine interacts with a Hold-off state machine for the working segment by initiating a service mapping procedure of the Hold-off state machine for the working segment.

15. The method of claim 9, further comprising operating of each of the candidate protection segments without conflict with operations of other segments using an M-for-one (M:1) hold-off state machine comprising a stateChange variable, wherein the M:1 Hold-off state machine is implemented for each one of the candidate protection segments and uses a Hold-off timer to coordinate switching between the candidate protection segments.

16. The method of claim 9, wherein the PSS state machine and the M:1 hold-off state machine are M:1 Infrastructure Protection Switching (IPS) state machines.

17. An M-for-one (M:1) infrastructure protection switching (IPS) apparatus comprising:
a Hold-off state machine for working segment for each infrastructure Production Group (IPG) which is supported by a plurality of second state variables;
an M:1 Hold-off state machine for each candidate protection segment which is supported by one first state variable; and
a list of candidate protection segments which are ordered by priority value and provisioned for each infrastructure Production Group (IPG) that deploys the M:1 IPS;
wherein the list of candidate protection segments contains at least one candidate protection segment;

wherein the candidate protection segments are mutually disjoint and disjoint from a working segment; and wherein the candidate protection segment having the highest priority among operational candidate protection segments is a protection segment;

wherein the combination of the Hold-off state machine and M:1 Hold-off state machine provides a M-for-one (M:1) protection function, where M is the quantity of the candidate protection segments; and wherein the second state variables comprise a Signal Fail (SF) variable, a Signal Fail Hold-Off (SFH) variable, a Lockout of Protection (LoP) variable, a Forced Switch (FS) variable, an MStProtection (MStP) variable, and an MStWorking (MStW) variable, and wherein the first state variable comprises a SF variable for each port associated with each of the candidate protection segments.

18. The apparatus of claim 17, further comprising: wherein in the absence of any operational candidate protection segments, the protection segment retains the value it had prior to the failure of the last candidate protection segment and a 1:1 IPS protection segment is declared to have failed.

19. The apparatus of claim 18, wherein if the 1:1 IPS protection segment is not operational, and a candidate protection segment becomes operational, said candidate protection segment assumes the role of the 1:1 IPS protection segment and the 1:1 IPS protection segment becomes operational.

20. The apparatus of claim 19, wherein if a candidate protection segment of higher priority than the protection segment becomes operational, then said candidate protection segment assumes the role of the 1:1 IPS protection segment.

* * * * *